Feb. 14, 1956 R. W. SONNENFELDT 2,734,945

WAVE GENERATING SYSTEMS

Filed July 8, 1952 2 Sheets-Sheet 1

INVENTOR.
Richard W. Sonnenfeldt

BY

ATTORNEY

INVENTOR.
Richard W. Sonnenfeldt
BY
ATTORNEY

United States Patent Office 2,734,945

Patented Feb. 14, 1956

2,734,945

WAVE GENERATING SYSTEMS

Richard W. Sonnenfeldt, Haddonfield, N. J., assignor to Radio Corporation of America, a corporation of Delaware Application July 8, 1952, Serial No. 297,690

17 Claims. (Cl. 178—69.5)

Figures 1, 2, 3:
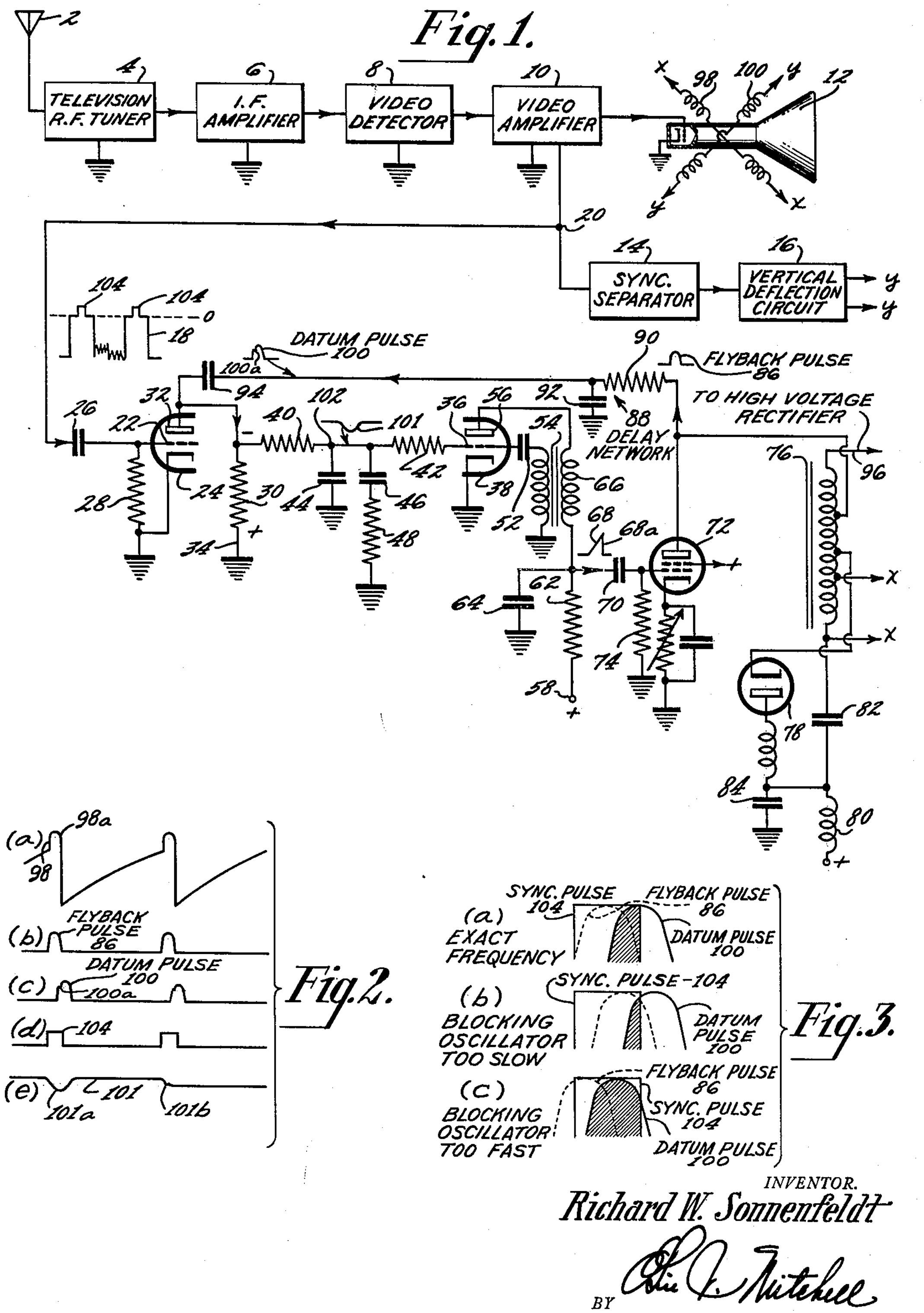

The present invention relates to electric wave generating circuits and means for stabilizing and controlling the frequency and phase thereof.

In more particularity, although not necessarily exclusively, the present invention relates to improvements in synchronizing and controlling the frequency and phase of cathode ray beam deflection circuits of the type frequently employed in television receiving systems.

Perhaps no problem in the television art has received, and is containing to receive more attention than that of precisely synchronizing deflection signal generators in accordance with synchronizing information included in and derived from the United States R. M. A. Standard Television Signal.

This television signal represents synchronizing information (generally known in the art as synch) at its higher amplitude peaks which synch peaks occur in the direction of black picture information. The synch peaks or pulses are situated on top of what are commonly known as blanking signals, which are comprised of sufficiently large excursions to correspond to a light datum of zero intensity in the reproduced scene. According to the R. M. A. Television Standard, this form of synchronizing signal is interspersed with video signal information in the modulation of a radio carrier, such that peaks of synch represent 100 percent carrier modulation.

It has been the general practice in the prior art to separate synchronizing components from the composite television signal on an amplitude threshold or gate basis, in which all signals of a given amplitude will be allowed to pass unrestricted. The threshold or gate level is generally established at the level of blanking, which corresponds to the bottom or base of the synchronizing signals. Thus synchronizing signals are in effect "clipped" off from the composite television signal.

It has heretofore been the practice to maintain the clipping level or threshold, by rectifying the peaks of synch so as to successfully clip synch, from the remainder of the signal, regardless of changes in over-all radio carrier level. Such arrangements have always been beset by the inability of the synch separating circuits to discriminate against noise pulses occurring between synch pulses. That is to say, noise pulses arriving between synch pulses in the arrangements taught in the prior art have caused the clipping threshold to rise (just as though there had been an increase in the signal level) so that there may exist a short period of time following a noise impulse during which synch may not rise above the clipping level of the synch separator and hence not get through the "gate" to the deflection circuits of the television receiver.

It has been with these considerations in mind that prior art television receiving circuits have provided special circuits involving numerous tubes whose sole purpose was to reliably clip synch from the incoming signal and deliver this synchronizing information to the deflection circuit of the television receiver as independently of noise as possible.

Aside from the effects of noise in disturbing the clipping level of prior art synchronizing signal separators, the noise itself upon reaching amplitudes in the range of synch has been found to often pass through the synchronizing separating circuits and to mis-synchronize the deflection circuits. This undesirable effect has been partially overcome by the provision of automatic frequency control deflection circuits whose frequency of operation is indirectly controlled by the separated synch through the agency of phase comparator circuits. Although a high degree of noise immunity is obtained by such arrangements the complexity and circuit parameters required for most prior art arrangements of this type have been unduly costly.

The present invention overcomes many of the problems arising in prior art signal generating circuits, synchronizing circuits and television deflection circuits, some of which have been discussed above, through the provision of a combination wave form generating and frequency control system which does not require the separation, per se, of synchronizing signal from a composite signal of many components. Furthermore, the system of the present invention provides self-immunization through "keyed" gating action, against noise, appearing during intervals between the arrival of synchronizing signals. Moreover, the present invention in some of its more simple yet fully successful forms may be embodied in a single electron tube, thereby eliminating the need for numerous electron tubes and circuitry now considered by the prior art as necessary in the manufacture of television receivers. The present invention also offers general improvement to most forms of television deflection AFC systems through the provision of improved filter techniques as applied to the AFC control voltage.

It is, therefore, seen that one object of the present invention is to provide an improved oscillator frequency and phase controlling system which has a marked degree of immunity against spurious synchronizing and control signals.

It is further the purpose of the present invention to provide an improved synchronizing system for the control of electrical wave generators.

It is a still further object of the present invention to provide improved deflection synchronizing systems for television receivers.

Another object of the present invention resides in the provision of an improved and simplified automatic frequency control circuit for cathode ray beam deflection systems.

Still another object of the present invention resides in the provision of a television deflection circuit for incorporation in commercial television receivers which eliminates the need of providing specialized circuits for separating from and processing the synchronizing signal component from the composite television signal.

Accordingly, it is a still further object of the present invention to improve the over-all performance of commercial television receivers, and, at the same time, reduce their manufacturing cost.

It is a still further object of the present invention to provide a new and novel deflection system having a high noise immunity as well as pronounced stability and sensitivity.

Another object of the present invention resides in the provision of a television deflection signal generating circuit employing but a single tube yet providing both automatic frequency control of the signal generating circuit as well as a gated synchronizing signal amplifying action whereby to discriminate against noise pulses received between synchronizing signals.

Figure 4:
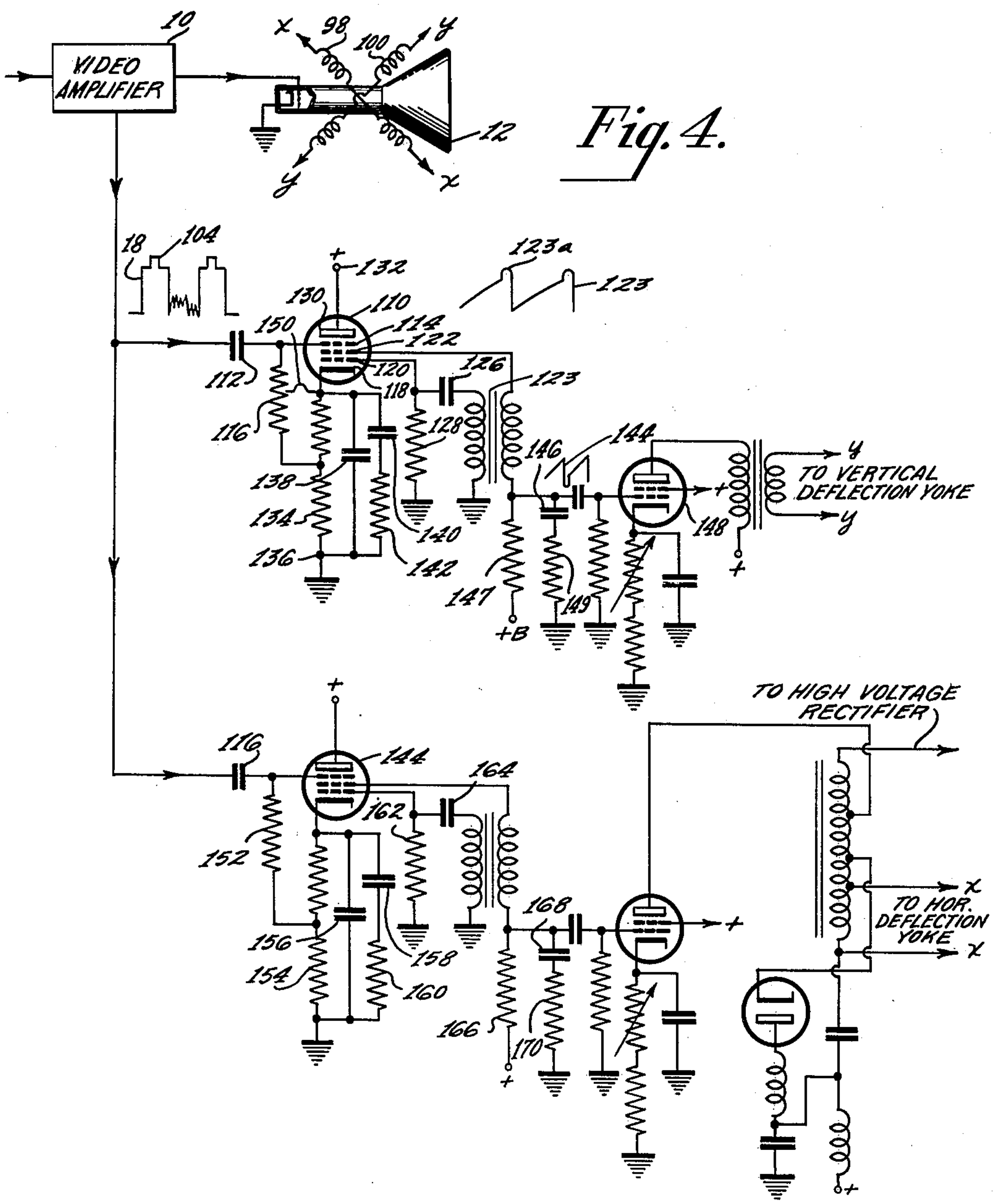

Other objects, as well as advantages, of the present invention will become apparent as the description thereof, hereinafter set forth, proceeds. The invention itself will be best understood both as to its mode of operation and the possible ways of practicing the same by reference to the specification, especially when taken in connection with the accompanying drawings, wherein:

Figure 1 is a combination block and schematic representation of one form of the present invention, Figure 2 is a graphical presentation of certain electrical wave forms encountered in the practice of the present invention as, for example, set forth in Fig. 1, Figure 3 is a graphical representation of still other electrical wave forms encountered, for example, in the arrangement illustrated in Fig. 1, and Figure 4 is a combination block diagram and schematic representation of another and more simplified form of the present invention as it may be applied to the deflection function of present day television receivers.

Referring now to the embodiment of the present invention shown in Fig. 1, there is represented at 2, a typical television receiving antenna adapted to feed received television signals to the R. F. tuner 4 of a television receiving system. The output of the R. F. tuner 4 is applied to an I.-F. amplifier 6 whose output in turn is supplied to the video detector 8.

From the output of the video detector 8 demodulated video signal is applied to the video amplifier 10 whose output is conventionally applied to modulate the electron beam of a cathode ray picture reproducing tube or kinescope 12.

Video signal at a suitable amplitude is also applied to a typical prior art synchronizing signal separator 14, whose function is to separate synchronizing signal components of received video signal and apply them in a conventional manner for the control of the vertical deflection circuit 16. Suitable circuitry for inclusion in the block elements shown above and throughout this entire specification are well-known in the art and are to be found in the literature for example, in the Radio Electronics Magazine, November 1950, pages 34 and 36, under the title of "Radio set and service review," and also in the "RCA Review" for March 1947 in pages 5 through 28.

In accordance with the present invention, the video signal 18, appearing at the terminal 20 of the video amplifier 10 is also coupled to the control grid 22, of electron tube 24 via capacitor 26. A suitable control grid ground return for tube 24 is supplied by the resistor 28. An anode cathode path for the tube 24 is supplied by means of resistor 30, connected from the anode 32 to a datum or ground potential having a terminal at 34. Signal wave forms appearing in the anode 32 of tube 24 are coupled to the grid 36 of electron tube 38 by means of resistors 40 and 42. Suitable time constant networks whose action form an important part of the present invention are provided by condensers 44 and 46 taken in connection with resistor 48. These latter elements provide one common form of low-pass filter network having a quite linear phase response. Other forms of low-pass networks may be used in the practice of the present invention.

Electron tube 38 is connected as a well-known blocking oscillator which includes the grid ground return resistor 50, coupling capacitor 52 and blocking oscillator transformer 54. The anode 56 of vacuum tube 38 is supplied with operating potential from a positive power supply terminal 58 through a saw-tooth discharge network 60 (comprising resistor 62 and capacitor 64) and thence through the primary 66 of the blocking oscillator transformer 54. The saw-tooth wave form 68 developed across the saw-tooth discharge network 60 is capacitively coupled via capacitor 70 to the input of deflection driving tube 72. A grid ground return impedance for the driver tube 72 is provided by resistor 74.

The direct drive deflection circuit connected with the tube 72 and including auto transformer 76, damper tube

78, inductance 80 and capacitors 82 and 84 is well known in the art and is described in the John F. Rider Publishing Co. publication entitled "Television Service Notes," vol. 9, page RCA 7–78 published in 1951.

The well-known deflection fly-back pulse 86 appearing at the anode of electron tube 72 is applied to a delay network 88 comprising resistor 90 and capacitor 92. The signal appearing at the output of the delay network 88 is applied at capacitor 94 to the anode 32 of vacuum tube 24. A higher voltage version of the fly-back pulse 86 appears, of course, at the upper terminal 96 of the auto transformer 76 in accordance with the widely used technique of rectifying the same for use as high voltage beam accelerating potential for kinescope 12.

The horizontal and vertical deflection coils represented at 98 and 100 are indicated for corresponding connection across the terminals YY of vertical deflection circuit 16 and the terminals XX of the horizontal deflection circuit.

In understanding the operation of the embodiment of the invention shown in Fig. 1, it should be assumed that all operating potentials have been applied to the elements shown in the drawing and that the electron tubes are in an operative state. It will further be assumed that no video signal is being received by the R. F. tuner 4.

Under such conditions, the vacuum tube 38 will be active to produce a saw-tooth wave form 68 by means of the blocking oscillator circuit with which it is connected. As is well known by one skilled in the art, the wave form at the grid 36 of the blocking oscillator tube 38 will appear substantially as shown at 98 in Fig. 2.

In accordance with the present invention the time constant of the capacitor 52, taken in conjunction with resistor 50, is such to maintain the blocking oscillator at an operating frequency slightly above the line repetition rate of the televsion system. By way of example, in a 525 line television system, this blocking oscillator would be adjusted to operate by itself in the range of 15,750 C.P.S. Each time the tube 38 becomes conductive, represented by the peak 98A of wave form 98 in Fig. 2, the capacitor 64 is discharged to produce the return trace portion of 68A of saw-tooth 68. This action is well known in the art. Saw-tooth deflection wave form 68 is then conventionally used to drive the horizontal deflection output tube 72 so as to produce the above-mentioned and well-known flyback pulse 86 corresponding to the return trace period of the deflection cycle.

In accordance with the particular embodiment of the present invention, shown in Fig. 1, this fly-back pulse 86 is applied to a delay network such as 88 which may comprise an integrating network including, for example, resistor 90 and capacitor 92. Delay network 88 is designed to produce a suitable delay, whose magnitude and purpose will be later discussed, as to produce a datum pulse 100 of substantially the same wave form as fly-back pulse only delayed in respect to time thereto. The datum pulse 100 is then rectified by the vacuum tube 24 to produce a negative potential having a pulse component at terminal 102 of capacitor 44. This negative going wave form is then presented to a low-pass filter, such as in the integrating network comprising resistor 40, capacitor 44 and capacitor-resistances 46 and 48, before being applied to the grid 36 of the blocking oscillator 38. As is well known, the grid cathode potential of the blocking oscillator determines its operating frequency hence the free running frequency of the blocking oscillator 38 will be rendered a function of the voltage appearing at terminal 102.

In accordance with the present invention, the vacuum tube 24 is arranged to act as a coincidence detector and so deliver at terminal 102 a signal which will represent the degree of time coincidence between synchronizing voltage, applied to grid 22 and the datum pulse 100 applied to anode 32.

Assuming now the detection by R. F. tuner 4 of a video carrier there will exist at the terminal 20 of the video amplifier 10 a video signal 18 described herein above.

Demodulated video signal 18 will then be applied to the grid 22, of the tube 24, thus permitting synch peaks 104 to draw sufficient grid current to set up, in the time constant circuit comprising capacitor 26 and resistor 28, a negative bias of sufficient magnitude to permit an anode cathode conduction in tube 24 only during peaks of synch. However, in accordance with the novel features of the present invention, conduction in tube 24 can only occur during the interval of datum pulse 100. This is seen since anode 32 is negative with respect to it cathode, as the same above, at all times except during the duty cycle of datum pulse 100. Thus anode cathode conduction in tube 24 is possible only upon the at least partial coincidence of an arriving synchronizing pulse 102 and the datum pulse 100.

Since according to the present invention the free-running frequency of the blocking oscillator 38 is desirably above the frequency of the arriving synchronizing pulses 104, anode current through resistance 30 will be established only during the occasional coincidence of pulse 100 with the arriving synch pulses. The time constant of resistances 30 and 40 in combination with capacitance 40 and 44 is such that the occasional coincidence of the datum pulse 100 with the arriving synch pulses will cause a negative going voltage frequency correction signal to be developed across the capacitor 44. If a given frequency difference were permitted to continue a frequency correction wave form 101*a* shown in Fig. 2E would be developed. This wave form can be seen to have a width which is manifestly larger than either the datum pulse 100 or the arriving synchronizing pulse 104. This follows, since there exists, in accordance with the present invention, at the beginning of coincidence detection, a net frequency difference between the blocking oscillator and the repetition frequency of the arriving synch pulses. Thus, the datum pulse 100, shown in Fig. 2–C will be in effect running through the synch pulse 104 from right to left (in the figure). This gives the apparent broadening effect to the frequency correction pulse 101.

Let it be assumed that the blocking oscillator 38 has, by way of example, been set at a frequency of 100 cycles above the repetition rate of the arriving synchronizing pulses 104. In such a case every .01 second running coincidence must occur between a synch pulse 104 and a datum pulse 100. During this coincidence, the datum pulse 100 will, as noted above, be seen to run through from right to left the synch pulse 104. The frequency correction output pulse 101*a* appearing at the upper terminal of capacitor 44 will then have a left hand extremity defined by the leading edge of the datum pulse 100.

The right hand extremity of the wave form 101 will, of course, be defined by the right hand extremity or trailing edge of synch pulse 104. This is assuming, of course, that the net frequency difference continues to exist between the blocking oscillator and the arriving synch pulses for an interval long enough to let the datum pulse 100 run completely through the synch pulse 104.

However, in practicing the present invention, the blocking oscillator 38 is adjusted so that the downward going front edge of the frequency correction pulse 100*a* produces sufficient frequency correction of the blocking oscillator 38 to bring the blocking oscillator frequency within at least $\frac{1}{20}$ percent of the frequency of the arriving synchronizing pulses. This prevents the completion of the pulse wave form 101*a* so that the actual correction wave form is more properly shown at 101*b*, Fig. 2E.

By examining together Figs. 2–C, 2–D, 2–E and Fig. 3–A, the latter showing a more detailed relationship between the datum pulse 100 and the synch pulse 104, it can be seen that the peak of the correcting signal 101 will substantially correspond to a "half coincidence" position of the datum pulse 100 with the synch pulse 104. It is well known in the art that once an oscillator comes within a small fraction of a percent of the frequency to which it is to be synchronized, it requires very little energy to accomplish the necessary correction to produce exact synchronization. In fact, in practice, it is found that mere random circuit noise is sufficient to accomplish this synchronization.

Since blocking oscillator 38 will operate at the arriving synchronizing pulse repetition rate for only a discreet value of bias on the control electrode 36, and since, in accordance with the present invention, this discreet bias voltage is obtained only when the datum pulse 100 and the synchronizing pulse 104 have the specific relationship shown in Fig. 3–A, conditions along the lower portion of the negative going slope of the frequency correction pulse 101 are ideal for lock-in between the blocking oscillator and the arriving synchronizing pulses. It is for this reason that if the synchronizing pulse 104 is first sampled at a time when the datum pulse 100 is to the right of the trailing edge of the synchronizing pulse 104 (Fig. 3–A), complete synchronization will occur within the first half of the downward going portion of the wave form 101.

It may also be considered that precise synchronization between the blocking oscillator 38 and the arriving synchronizing pulses, once the blocking oscillator 38 is within at least 10 cycles or so of operating at the synchronizing signal repetition frequency, is accomplished by the leading edge of the synch pulse 102, causing a virtually imperceptible nick 100–A in the datum pulse, which disturbance is fed by stray circuit capacitance to the grid or anode of the blocking oscillator tube 38.

Once the blocking oscillator 38 has been synchronized with the arriving synchronizing pulses and the condition shown in Fig. 3–A obtains, it will be seen that an automatic frequency control action maintains the synchronization thereafter. Should, for example, the blocking oscillator tend to lower its frequency, the datum pulse 100 will in effect, shift to the right, relative to the synch pulse 104 (see Fig. 3–B), thereby reducing the amount of common area in the coincidence of the datum and synch pulse. This will, of course, reduce the rectified current though resistance 30 of the coincidence detector 24, and reduce the negative potential applied to the grid 36 of the blocking oscillator. As is well known in the art, reducing negative potential on the grid of a blocking oscillator will increase its operating frequency. This corrective action will continue until the condition illustrated in Fig. 3–A is re-established.

On the other hand, should the blocking oscillator tend to increase its operating frequency, the action illustrated in Fig. 3–C will occur. The datum pulse 100 will then shift to the left relative to the synch pulse 104, thereby increasing the common area in the coincidence of the datum and synch pulse. This will increase the rectified current through the resistor 30 in the anode circuit of the coincidence detector 24, increase the negative control voltage on the grid 36 of blocking oscillator 38 and thereby reduce the blocking oscillator frequency.

It is, therefore, seen that the novel arrangement of the present invention not only provides positive pull-in but also provides an antecedent automatic frequency control action which maintains the synchronization.

The present invention also contemplates the novel design of a low-pass filter connecting the resistance 30 to the control electrode 36 of the blocking oscillator such that its cutoff frequency is substantially equal to the maximum expected frequency difference, between the blocking oscillator 38 and the frequency of the arriving synchronizing pulses. This latter feature is particularly important in order to insure maximum noise immunity and maximum phase stability along with maximum pull-in and stay-in ability.

This is best accomplished by further insuring that the low-pass filter has a substantially linear phase characteristic. In the embodiment shown in Fig. 1 phase linearity is supplied by the combination of capacitor 44 with the series combination of capacitor 46 and resistor 48. Without a linear phase shift, characteristic in the pass filter, the wave form 101 as applied to the grid 36 blocking oscillator may have such a peak amplitude and sharp rise time as to over-correct the blocking oscillator 38 and thereby cause an undesirable "hunting" action. Capacitor 46 and series resistor 48 may, in this respect, be termed as what is commonly known as an "anti-hunt" circuit. It will be understood that the novel design of the low-pass filter through which the frequency correcting signal must pass, such that its cut-off frequency is substantially at the highest frequency beat to be encountered between the oscillator and synch, is applicable to numerous other deflection circuit frequency control systems. It is for this reason that this aspect of the present invention is not to be construed as limited to the particular use shown in connection with the circuit arrangements of the present disclosure.

Although no synchronizing signal separation, per se, is accomplished, in the practice of the present invention, it will be seen that the only portion of the composite television signal of importance to the operation of the present invention, is the synchronizing signal wave form 104. By adjusting the time constant of capacitor 26 with resistor 28 in the grid circuit of the current tube 24, of Fig. 1, a sufficiently negative bias may be set up on the grid 22, corresponding in value to the maximum amplitude of the blanking pulses. In this way only synchronizing pulse information will be effectively compared with the datum pulse 100. Should noise or other disturbances occur between synchronizing pulses the arrangement of the present invention prevents such spurious signals from being communicated to the deflection signal oscillator. This is true simply because the tube 24 is completely cut off between recurrent synchronizing pulses. It is cut off for two reasons, first the bias on the grid 22 is so highly negative that even if positive plate voltage in the form of pulse such as 100 were applied to the anode 32, no plate current would flow; secondly, the voltage of anode 32 is always negative except during the occurrence of the datum pulse 100. Thus double insurance is given against response to noise.

As mentioned above, it is important, although not necessary, in the practice of the present invention to provide a delay network such as 88 for delaying the fly-back pulse 86. The delay network 88 may be designed to provide a delay corresponding to half the time duration of the synchronizing pulses. Thus, as shown in Fig. 3–A, when the blocking oscillator 38 is locked in with the arriving synch such that the leading edge of the datum pulse 100 bisects the synch pulse 104, the fly-back pulse 86 will be in exact coincidence with the synch pulse. This permits the retrace time of the horizontal deflection circuit to be maximized and hence yield maximum efficiency of the deflection circuit. See article entitled "Characteristics of high efficiency deflection and high voltage supply systems for kinescope," appearing in the "RCA Review" for December 1949, written by Otto H. Schade.

The embodiment of the present invention shown in Fig. 4 is a simplified version of the arrangement shown in Fig. 1. The arrangement shown in Fig. 4, however, shows the present invention applied to both the horizontal and vertical deflection circuits of a television receiver.

Thus, the video amplifier 10, in Fig. 4, supplies the composite video signal 18 to both what will be termed the vertical comparator-generator tube 110 via capacitor 112 and to what shall be called the horizontal comparator-generator tube 114 via capacitor 116.

Since the fundamental operation of both the horizontal and vertical comparator-generator tubes 110 and 114 in accordance with the present invention is substantially the same, a description of the operation of only the vertical comparator-generator tube 110 will be presented. The differences in circuit parameter values in the circuits associated with the horizontal comparator-generator tube 114 and those connected with the vertical comparator-generator tube 116 will be explained later in this specification.

Referring now to Fig. 4, the composite television signal 118 upon being applied to the suppressor grid 114 of the comparator-generator tube 110 will set up a negative bias on the suppressor grid 114 of a magnitude dependent upon the value of the resistance of 116 and the peak amplitude of the synch pulses 104. This action is identical to that described in connection with electrode 22 of vacuum tube 24 in Fig. 1. In this way, only the peaks of the composite video signal corresponding to the horizontal synchronizing pulses will cause the control electrode 114 to swing positively with respect to the cathode 118.

In further accord with the embodiment of the present invention shown in Fig. 4, the control electrode 120 and signal electrode 122 of the amplifier 110 are connected with the blocking oscillator transformer 123 in precisely the same fashion, as the anode and control electrodes 56 and 36 of vacuum tube 38, in Fig. 1, are connected with the blocking oscillator transformer 54. Thus, there will appear at the terminal 124 of the blocking oscillator transformer 122, a wave form 123 which will appear substantially the same as wave form 98 shown in Fig. 2–A. The frequency of the blocking oscillator will, of course, be determined by the time constant of capacitor 126 and resistance 128 as well as the net bias voltage existing between the control electrode 120 and the cathode 118.

The anode 130 of the amplifier tube 110 is connected with a positive power supply potential having a terminal shown at 132. The cathode 118 of the tube 110 is connected through a tapped resistance 134 with a datum or ground potential having a terminal at 136. Suitable network elements comprising capacitor 138, capacitor 140 and resistance 142 are connected with the resistance 134 to form a low-pass filter having a suitable low frequency cut-off described herein above.

The saw-tooth output 144 developed across the saw-tooth charging capacitor 146 is capacitively coupled to the vertcial deflection output tube 148. The precise form of the vertical and horizontal output deflection amplifiers are not of importance in the practice of the present invention. For this reason, detailed discussion of the operation of both the vertical and horizontal output stages shown in Fig. 4 will not be undertaken.

In the operation of the comparator-generator tube 110 of the present invention, it will be seen that conduction in the cathode circuit of the tube 110 can occur only during the peak 123*a* of the blocking oscillator wave form. This periodic conduction will develop a net voltage across the resistance 134 which bias voltage will remain at a stabilized value while the blocking oscillator section of the tube 110 is free running. Upon the arrival of synch pulses, the suppressor grid 114, previously biased to a point prohibiting static anode current in the tube 110, will permit anode current to flow during positive synch peaks. This synch peak current conduction in the anode circuit, of course, can obtain only if a synch peak coincides at least in part with pulse 123*a* of the blocking oscillator.

As in the previous embodiment of the present invention, it is to be assumed that the blocking oscillator free running frequency is above the repetition rate of the arriving synch pulses. Under such conditions, there will occur coincidence between the arriving synch pulse and the peak 123*a* of the blocking oscillator wave form at a frequency equal to the difference or beat between the blocking oscillator frequency and the repetition rate of the arriving synchronizing pulses. However, as in the previous embodiment, shown in Fig. 1, under normal average operating conditions, only one such coincidence need at least partially occur. This is because there will be present at the cathode 118 a wave form 150 similar to wave form 101 in Fig. 2–E. The positive going portion of this wave form 150 will swing the cathode 118 in a positive direction, therefore, tending to slow down the oscillator section of tube 110 to frequency within approximately 10 cycles of the synch pulse repetition rate. It is at this point that any vestige of arriving synchronizing pulse 104 respectively coupled through internal or external stray capacitance to the blocking oscillator electrodes 120 and 122 will cause precise synchronization and lock-in between the blocking oscillator action and arriving synchronizing pulses.

Referring to Fig. 3–A, the datum pulse 100 may for the purposes of explaining the operation of the embodiment in Fig. 4 be considered to correspond to the pip 123a of the blocking oscillator wave form 123 in Fig. 4. The synch pulse 104 in Fig. 3–A will, of course, be common to both the embodiments of Fig. 1 and Fig. 4. Thus it is that the blocking oscillator section of tube 110 in Fig. 4 will be locked in such that the leading edge of pulse 123a in Fig. 4 will substantially bisect the synch pulse 104 as it appears on the suppressor electrode 114 of tube 110.

Should the blocking oscillator tend to slow down, a condition similar to that shown in Fig. 3–B, will obtain such that the datum pulse 100 (corresponding to pulse 123a in Fig. 4) will shift to the right of the synch pulse thereby reducing the peak cathode current flow through the resistance 134. This will decrease the negative control electrode cathode bias 120 of tube 110 and tend to speed up the blocking oscillator action.

Should the blocking oscillator tend to increase its frequency a condition similar to that shown in Fig. 3–C is approached such that the cathode current through the resistance 134 increases the negative control electrode-cathode bias of the blocking oscillator circuit and reduces the blocking oscillator frequency. Thus, complete automatic frequency control action is achieved.

The capacitor 138 of Fig. 4 and the series combination comprising capacitor 140 and resistance 142 are so proportioned as to provide a low-pass filter network coupling the cathode 118 with the control electrode 120. The cut-off frequency of this low-pass filter is, as described above, assigned a value equal to the maximum expected difference frequency between the blocking oscillator section of the tube 110 and the repetition rate of the arriving synchronizing pulses.

The elements 140 and 142 tend to linearize the phase shift characteristic of the low-pass filter and tend to prevent "hunting" or over-shooting in the correction of the blocking oscillator frequency.

By way of example, it has been found in the practice of the present invention that the following circuit values have provided satisfactory circuit operation for the vertical deflection circuit of a standard 60 field per second television receiver:

In Fig. 1:

| | | |
|---|---|---|
| Element **26** | μμf | 820 |
| Element **28** | megohms | 3.9 |
| Element **30** | ohms | 68,000 |
| Element **40** | do | 82,000 |
| Element **42** | megohms | 1 |
| Element **44** | μf | .5 |
| Element **46** | μf | 4 |
| Element **48** | ohms | 4,700 |
| Element **50** | megohms | 3.9 |
| Element **52** | μμf | 4,700 |
| Element **62** | megohms | 2 |
| Element **64** | μf | .01 |
| Element **94** | μf | .01 |

For horizontal frequency operation of the circuit shown in Fig. 1, at the standard 15,750 C. P. S. line repetition rate, the following values will be found to operate in accordance with the present invention:

| | | |
|---|---|---|
| Element **26** | μμf | 82 |
| Element **28** | ohms | 820,000 |
| Element **30** | do | 68,000 |
| Element **40** | do | 82,000 |
| Element **42** | do | 150,000 |
| Element **44** | μμf | .02 |
| Element **46** | μf | .5 |
| Element **48** | ohms | 4,700 |
| Element **52** | μμf | 150 |
| Element **62** | ohms | 82,000 |
| Element **64** | μf | .001 |
| Element **94** | μμf | 220 |

In the embodiment of Fig. 4, the following circuit parameter values, by way of example, in connection with the vertical comparator-generator tube 110 will be found to provide operation in accordance with the present invention:

| | | |
|---|---|---|
| Element **112** | μμf | 82 |
| Element **116** | megohms | 5.6 |
| Element **126** | μμf | 1,000 |
| Element **128** | megohms | 2.2 |
| Element **134** | ohms | 47,000 |
| Element **138** | μf | 2 |
| Element **140** | μf | 12 |
| Element **142** | ohms | 1,800 |
| Element **146** | μf | .01 |
| Element **147** | ohms | 820,000 |
| Element **149** | do | 12,000 |

The horizontal comparator-generator circuit shown in the bottom portion of Fig. 4 operates in exactly the same manner as does the vertical control arrangement. The only difference between the two circuits will lay in the choice of values for the various parameters. For the sake of simplicity, the elements comprising the horizontal deflection control portion of the arrangement in Fig. 4 will be given arbitrary numerical indexes for the purpose of assigning exemplary circuit values which may be used in the practice of the present invention.

| | | |
|---|---|---|
| Element **116** | μμf | 82 |
| Element **152** | ohms | 330,000 |
| Element **154** | do | 100,000 |
| Element **156** | μf | .02 |
| Element **158** | μf | .5 |
| Element **160** | ohms | 3,900 |
| Element **162** | do | 120,000 |
| Element **164** | μμf | 150 |
| Element **166** | ohms | 82,000 |
| Element **168** | μμf | 820 |
| Element **170** | ohms | 148,000 |

It is to be understood in the above recitation of exemplary circuit values applied to the embodiments of the present invention shown in Fig. 1 and Fig. 4 that no limitation is to be inferred as to other values of circuit components which will operate in complete accordance with the present invention.

What is claimed is:

1. In an electrical wave synchronizing system, the combination of, a synchronizing pulse terminal at which appears a recurrent synchronizing signal, a self-sustaining electrical signal generator having a synchronizing signal input terminal, said generator including a multielectrode discharge tube, an electrical gating circuit including a portion of said multielectrode discharge tube and having at least an input signal terminal, an output signal terminal and a control signal terminal, coupling means connected from said synchronizing pulse terminal to said gate circuit input terminal, coupling means connected from said gate circuit output terminal to said signal generator synchronizing signal input terminal, means coupled with said signal generator for producing a control signal synchronous with said signal generator and coupling means from said control signal producing means to said gating circuit control signal terminal.

2. In an electrical wave generating system, the combination of an input terminal means adapted to receive synchronizing signal information, an electrical oscillator embracing at least two elements of a wave amplifying device, and having a frequency controlling terminal, an amplitude discriminatory signal gating circuit, to which may be applied a control signal for opening and closing said gating circuit, said gating circuit also embracing at least two elements of a wave amplifying device, impedance means coupling the output of said gating circuit with the frequency controlling terminal of said oscillator, means connected with said oscillator for deriving a gating control signal, means for controlling said gate in accordance with said control signal and signal coupling means connected between said input terminal means and said gating circuit for comparing said gating control signal with said synchronizing signal.

3. Apparatus according to claim 2, wherein the synchronizing signal to be applied to said input terminal has a predetermined frequency and wherein said electrical oscillator is given a nominal operating frequency in excess of said synchronizing signal frequency.

4. Apparatus according to claim 3, wherein said impedance means comprises a low-pass filter having a lower cut-off frequency substantially equal to the difference frequency between the nominal frequency of said electrical oscillator and the frequency of said synchronizing pulses.

5. In an electrical circuit the combination of an oscillator to be synchronized at a frequency below its free running frequency, a synchronizing signal terminal adapted to receive synchronizing signals for the control of said oscillator, an electrical gating circuit coupled with said oscillator such to permit opening of said gate only during predetermined portions of the oscillator cycle, coupling from said synchronizing signal terminal to the input of said gating circuit such that synchronizing signal can pass only when said gate is open and means coupling signals passed by said gate to said oscillator for synchronization thereof.

6. In an electrical wave generating and controlling system the combination of a source of: synchronizing signal wave form, an oscillator whose frequency is to be controlled by said synchronizing signal wave form, a coincidence detecting arrangement coupled with said signal source and said oscillator and responsive to the arrival of synchronizing signal wave form and certain predetermined portions of signal produced by said oscillator to develop a control signal representing the instantaneous frequency difference between said oscillator and said synchronizing signal wave form, means coupled with said oscillator and said coincidence detecting arrangement for controlling the frequency of said oscillator with said control signal and means coupled with said signal source and said coincidence detecting arrangement for interrupting the supply of synchronizing signal to said coincidence detecting arrangement in accordance with the signal produced by said oscillator.

7. In an electrical wave generating system a synchronizing pulse terminal at which appears a series of recurrent synchronizing pulses of a predetermined recurrence comprising, an electrical oscillator circuit having a predetermined free-running frequency higher than the recurrence frequency of said synchronizing pulses, means for comparing the signal developed by said oscillator with said synchronizing pulses to develop a frequency correction signal, means for applying said frequency correction signal to said oscillator to correct the frequency thereof to a value close to a recurrence frequency of said synchronizing pulses, means for inserting in said oscillator circuit at least a portion of said synchronizing pulses to effect exact synchronization of said oscillator with said synchronizing pulses.

8. In a television deflection circuit: a terminal means adapted to receive demodulated composite television signal, a signal amplifier having at least three control electrodes, an oscillator circuit connected for operation with two of said control electrodes, coupling means connected from said composite signal supply terminal to said other control electrode, means connected with said amplifier for detecting the current through said amplifying device and means connected with said last named means and said oscillator for controlling the frequency of said oscillator in accordance with the current through said amplifying device.

9. Apparatus supporting claim 8, wherein means are provided connected with said amplifier for biasing the control electrode to which composite television signal is applied to an extent that only peaks of synchronizing signal component in the composite television signal may influence the current through said amplifying device.

10. In a television cathode ray beam deflection system a deflection control oscillator having an inherent free-running frequency above the desired deflection frequency to which it is to be synchronized, an input terminal adapted to receive synchronizing signal, means for comparing the output of said deflection oscillator with the synchronizing signal appearing at said input terminal so as to produce a signal wave form having a recurrence frequency equal to the difference between the free running frequency of said oscillator and the synchronizing frequency appearing at said input terminal, means for controlling the frequency of said oscillator in accordance with a signal voltage, and a low pass filter coupled between the output of said signal comparing means and the input of said frequency controlling means, said low pass filter having a cut-off frequency substantially equal to the maximum expected frequency difference between said oscillator and the recurrence frequency of said synchronizing pulses.

11. In a television receiving deflection circuit combination of a terminal at which appears output demodulated television signal, an amplifier device having a plurality of electrodes corresponding to an anode cathode and at least three control elements, a blocking oscillator circuit connected between two of said amplifier control elements, means for coupling from said input terminal composite signal to the third of said amplifier control elements, an impedance in the anode cathode circuit of said amplifier, resistance means connected between at least one of said blocking oscillator control elements and said anode cathode impedance, resistance means connected from said composite signal control element to said anode cathode impedance and low pass filter means included in said anode cathode impedance.

12. Apparatus according to claim 11, wherein said blocking oscillator is operated at a free running frequency above the frequency of the synchronizing components of composite television signal and wherein said low-pass filter means displays a cut-off frequency substantially equal to the maximum expected frequency difference between said blocking oscillator free running frequency and the frequency of the television synchronizing component.

13. Apparatus according to claim 12, wherein said low pass filter means displays substantially linear phase shift characteristics over its pass band.

14. In a television receiving system, the combination of a terminal adapted to display demodulated composite television signal having at least a video component and a synchronizing component, a free running blocking oscillator developing an operating wave form having a pulse component, a signal gating circuit, adapted to receive said composite television signal, means for operating said gate in accordance with the pulse component of said blocking oscillator whereby to pass incoming television signal only during the pulse interval of said blocking oscillator operating wave form, means connected with said gating circuit for developing a frequency correction wave form in accordance with the coincidence between said blocking oscillator operating wave form pulse component and the synchronizing component of the television signal, means for controlling the frequency of said blocking oscillator in accordance with the frequency correction wave form and amplitude discriminatory means connected with said gating circuit for permitting only the higher amplitude portions of the television signal corresponding to the synchronizing component, to be passed by said gating circuit.

15. In a television receiver deflection system a video signal terminal adapted to display a composite television signal having at least a synchronizing component and a video component, an oscillator circuit developing and operating signal wave form having a pulse component, means connected with said oscillator circuit for developing a datum pulse wave form delayed with respect to the pulse component of said oscillator wave form, means for superimposing said datum pulse upon said video signal to develop a control signal representing the degree of coincidence between said datum pulse and the synchronizing component of said television signal, a low pass filter connected with the output of said control signal developing means and means for controlling the frequency of said oscillator in accordance with the output of said low pass filter, said low pass filter having a cut-off frequency substantially in the order of the maximum frequency difference encountered between said oscillator and the synchronizing component of said television signal, and means connected with said signal comparing means for restricting comparison of said datum pulse with said television signal to only those portions of said television signals having amplitudes in excess of a given minimum.

16. In a television receiver deflection system, the combination of a vacuum tube having a plurality of control electrodes, an anode, and a cathode, a blocking oscillator circuit connected between two of said control electrodes, a low-pass filter connected between said cathode and at least one of the control electrodes to which said blocking oscillator circuit is connected, a time constant charging circuit connected with a different control electrode, a means for applying composite video signal to said time constant charging circuit.

17. In an electrical wave generating system, the combination of: an input terminal means adapted to receive synchronizing signal information; an electrical oscillator means having a frequency control terminal; an amplitude discriminatory signal gating means to which may be applied a gating control signal; means for coupling said oscillator means and said gating means to control said gating means with signal developed by said oscillator; impedance means connected with said gating means and said oscillator means frequency control terminal for controlling said oscillator with gated signal information; and signal coupling means connected from said input terminal means to said gating means for gating of said synchronizing signal under the control of said oscillator signal.

References Cited in the file of this patent

UNITED STATES PATENTS

| | | |
|---|---|---|
| 1,958,027 | Wheeler | May 8, 1934 |
| 2,141,343 | Campbell | Dec. 27, 1938 |
| 2,227,066 | Cork et al. | Dec. 21, 1940 |
| 2,249,943 | Campbell | July 22, 1941 |
| 2,418,425 | Poch | Apr. 1, 1947 |
| 2,463,685 | Frendendall et al. | Mar. 8, 1949 |
| 2,479,081 | Poch | Aug. 16, 1951 |
| 2,566,762 | English | Sept. 4, 1951 |
| 2,570,836 | Mulligan, Jr. | Oct. 7, 1951 |
| 2,617,040 | Bailey | Nov. 4, 1952 |
| 2,632,050 | Parker | Mar. 17, 1953 |